United States Patent [19]

Gannon et al.

[11] 4,136,385

[45] Jan. 23, 1979

[54] SYNONYM CONTROL MEANS FOR MULTIPLE VIRTUAL STORAGE SYSTEMS

[75] Inventors: Patrick M. Gannon, Poughkeepsie; Andrew R. Heller, Mohegan Lake; Ronald M. Smith, Wappingers Falls, all of N.Y.

[73] Assignee: International Business Machines Corporation, Armonk, N.Y.

[21] Appl. No.: 781,022

[22] Filed: Mar. 24, 1977

[51] Int. Cl.$^2$ ............................................. G06F 13/00
[52] U.S. Cl. ....................................................... 364/200
[58] Field of Search ... 364/200 MS File, 900 MS File

[56] References Cited

U.S. PATENT DOCUMENTS

| | | | |
|---|---|---|---|
| 3,725,874 | 4/1973 | Van Heel | 364/200 |
| 3,781,808 | 12/1973 | Ahearn et al. | 364/200 |
| 3,902,163 | 8/1975 | Amdahl et al. | 364/200 |

Primary Examiner—Raulfe B. Zache

Attorney, Agent, or Firm—Bernard M. Goldman

[57] ABSTRACT

The embodiments relate to special controls in a processor which eliminate synonym entries in a translation lookaside buffer (DLAT) for a system which has DLAT entries that can concurrently translate virtual addresses in multiple address spaces into real main storage addresses. The controls provide a common space bit in any segment table entry (STE) or alternatively in any page table entry (PTE) in any private address space to indicate whether the segment or page, respectively, contains programs and data private to the address space or shared by all address spaces. Each DLAT entry contains a common/private storage indictor which is set to the state of the common space bit in the STE or PTE used in an address translation loaded into the DLAT entry. When the entry is read, the private/common storage indicator controls whether the DLAT can only be used by the address space identified in the DLAT, or by all address spaces.

9 Claims, 10 Drawing Figures

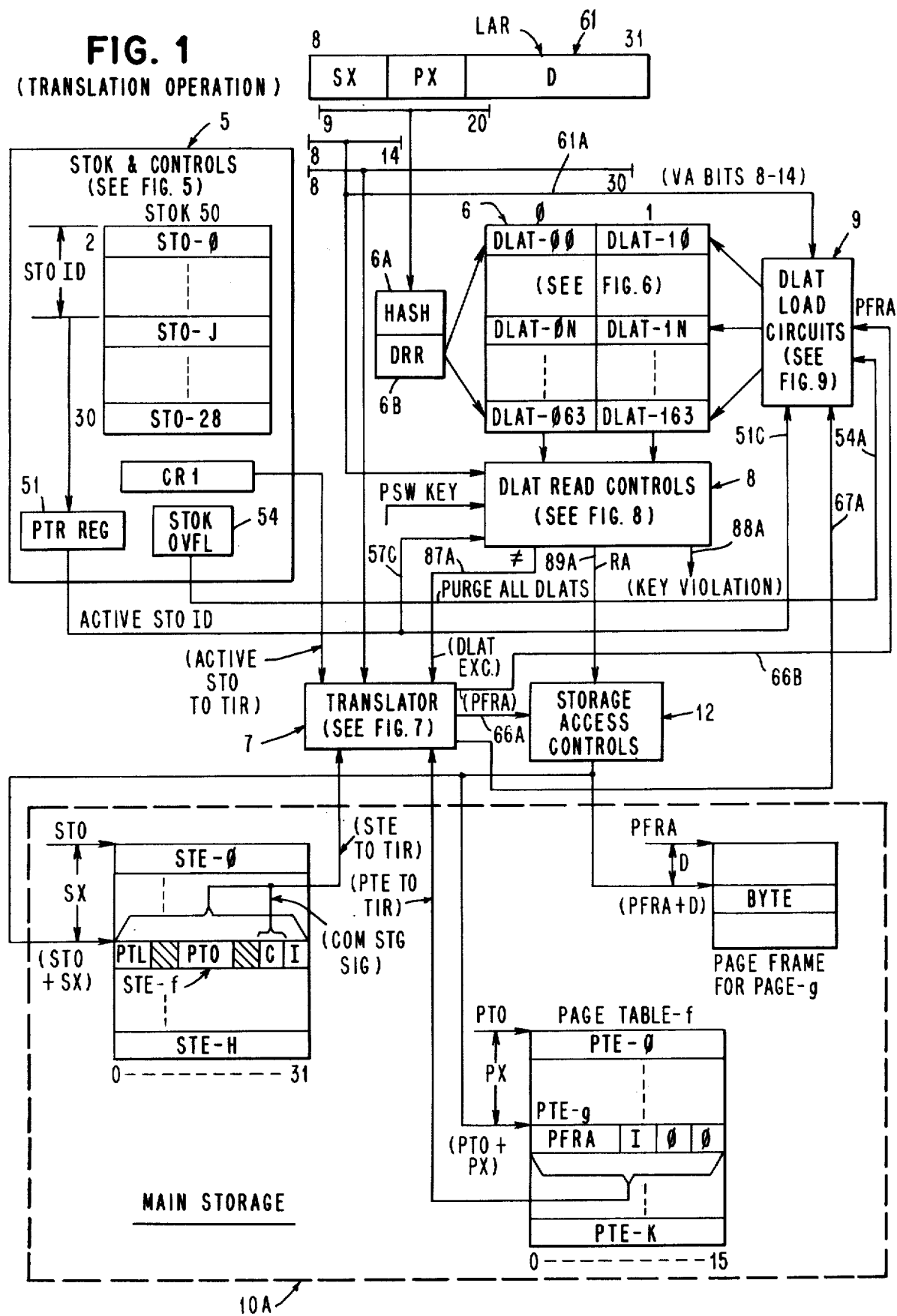
FIG. 1 (TRANSLATION OPERATION)

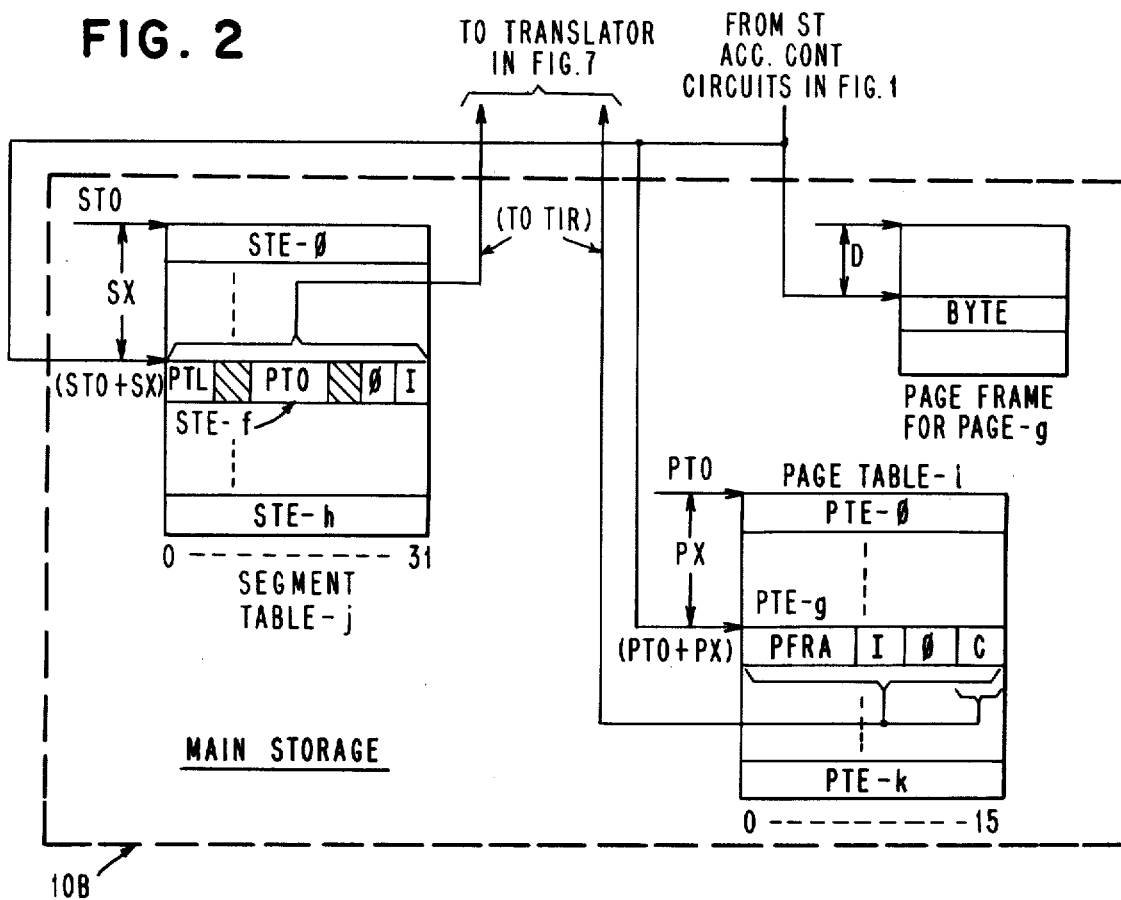

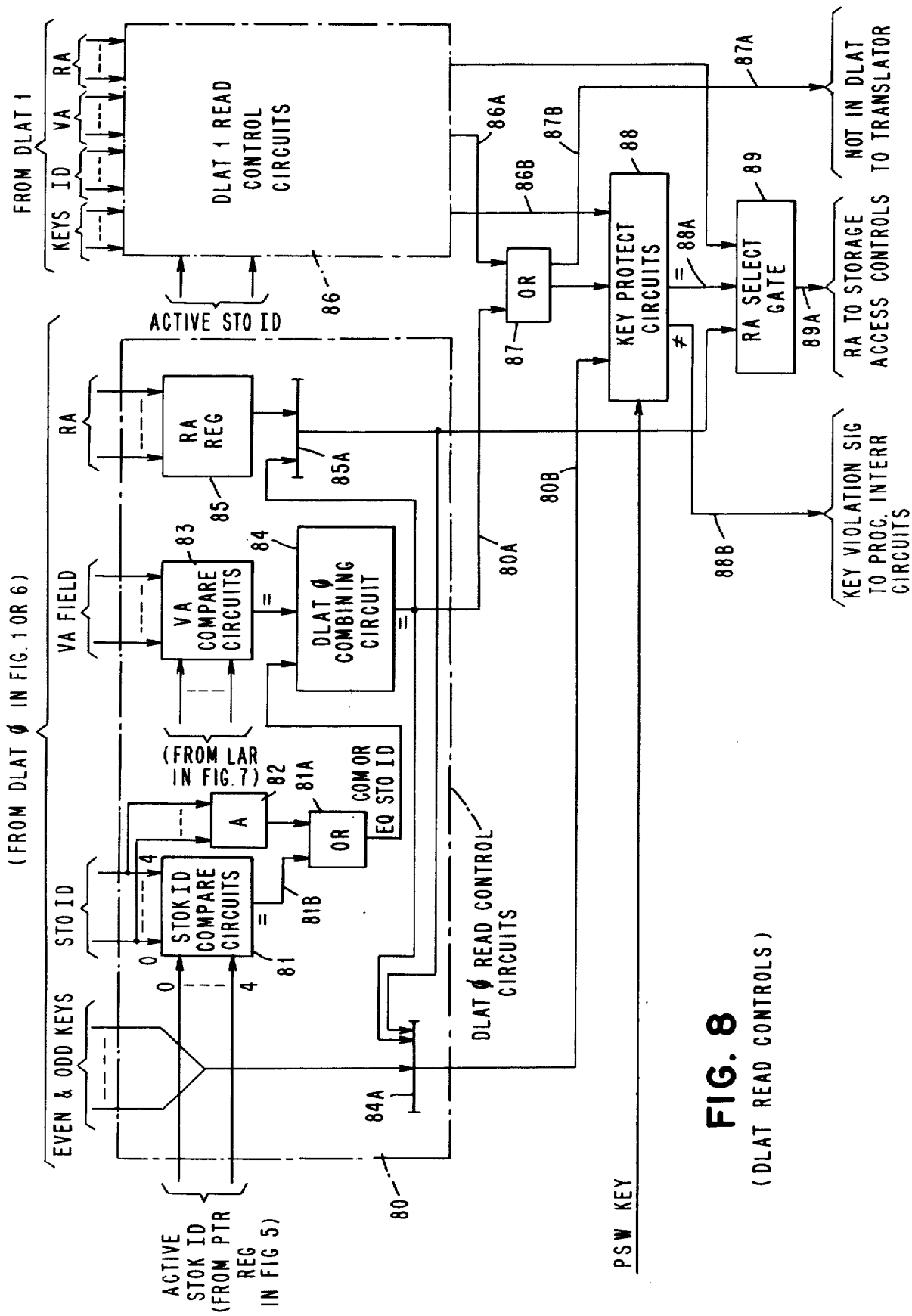
FIG. 8 (DLAT READ CONTROLS)

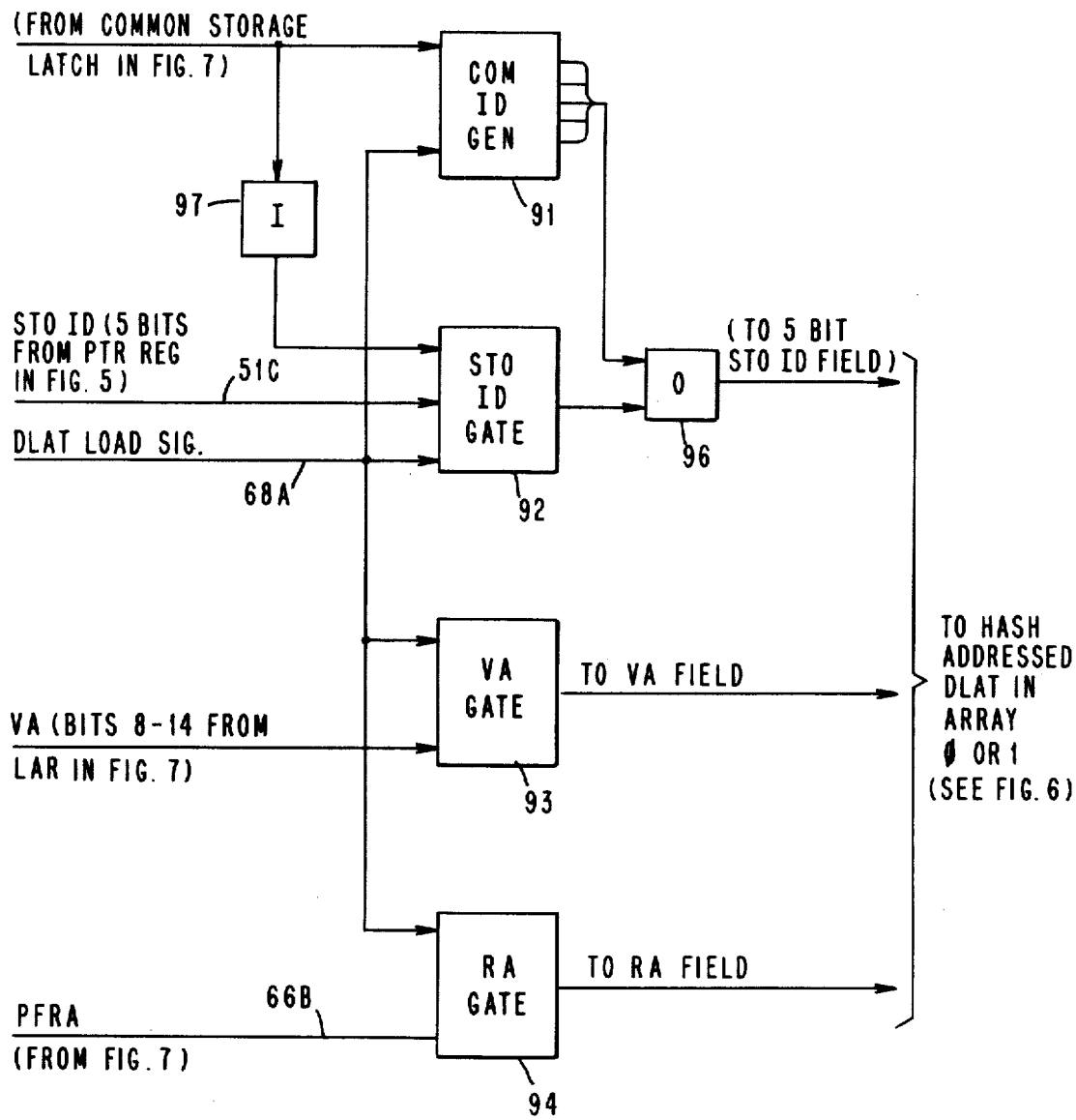
FIG. 9 (DLAT LOAD CONTROLS)

SYNONYM CONTROL MEANS FOR MULTIPLE VIRTUAL STORAGE SYSTEMS

INTRODUCTION

This invention relates generally to the elimination of synonym entries in a translation lookaside buffer (DLAT) used in high performance data processing systems which can simultaneously translate virtual addresses for multiple address spaces into real main storage addresses, wherein the different address spaces must have access to the same set of shared programs and data. A DLAT synonym is a DLAT entry which translates the same virtual address for accessing a page containing data or programs, that are also translated in another DLAT entry for the same information in the same page virtual address in another address space.

PRIOR ART

DLAT synonyms are found in prior systems which have dynamic lookaside address translation (DLAT) buffers. DLATs have been used for many years to increase the speed of accessing translated addresses in main storage, or in a high speed buffer (i.e. cache). Examples of DLAT prior art which fail to prevent DLAT synonyms are U.S. Pat. Nos. 3,725,874 to Van Heel, 3,781,808 to T. P. Ahearn et al, and 3,902,163 to Amdahl et al.

In systems supporting multiple address spaces, each user may be assigned a different address space; and for security addressability, performance, etc. reasons, no access is permitted from one private address space to another. Since the services of operating system programs (e.g. IBM OS/VS2 Release 2 MVS) are needed by all programs in all address spaces, the solution has previously been to assign those common programs and data to one or more segments (the same segment) in each of the address spaces. Whenever a user operating in his own address space required access to the common programs, he merely addressed the programs within his own address space. This separate manner of addressing has had an non-optimal effect on system performance because the common programs and data are translated by different DLAT entries in the processor. For example, if a user needed an OS program, that program is paged into main storage and translated for that user's address space. If another user desires the same program, it will not be paged into main storage again for the other user, however, it will be independently translated for that user's address space. The penalty for the translation for each address space resulted in a needless overhead in translation and in a waste of DLAT entries through the duplication of translations in DLAT entries (i.e. DLAT synonyms) for the various users concurrently requiring the same shared programs and data.

BRIEF SUMMARY OF THE INVENTION

It is a an object of this invention to eliminate the assignment of plural DLAT entries commonly used for programs shared by all address spaces.

It is a further object of this invention to improve processor efficiency in the use of the limited number of DLATs in the processor by eliminating redundancy in the assignment of DLATs to page frames having the same shared programs and eliminating the corresponding execution of translation processes due to this reduction.

It is a further object of this invention to minimize the thrashing, and resultant system overhead, in the reassignment of the limited number of DLAT entries in a processor when all of the DLAT entries become full due to many of them containing DLAT synonyms, wherein it then becomes necessary for the system to repeatedly swap out DLAT entries of application programs to make room for synonym DLAT entries, and then swap in the application program entries for execution.

It is an object of this invention to eliminate the waste of system time caused by DLAT and page synonyms by permitting one DLAT to be used by several or by all address spaces requiring access to common content.

It is still a further object of this invention to provide hardware which supports the shareability among all user address spaces of each segment having a common space flag bit set in its segment table entry in any user's segment table to indicate that the flagged segment is shared with other address spaces.

It is a further object of this invention to provide DLAT synonym control by controlling the setting of an indicator in each DLAT entry for indicating whether the DLAT entry is to be shared by all user address spaces or is to be restricted to a single address space identified in the DLAT.

It is another object of this invention to provide DLAT read controls which recognize whether an address space indicator within each DLAT entry is signalling that access should be restricted to the identified address space, or that the access should be permitted by ignoring the address space identification in the case of shared access. The capability of effectively eliminating address space identification in any DLAT entry allows shareability of the page addressed by the respective DLAT among all address spaces; while recognition of the address space indicator in the DLAT requires the DLAT to be used only by the identified address space.

The invention is used in the environment of a processor which can provide concurrent addressability in its DLATs for the most recently used pages in plural address spaces. The DLAT addressability for plural address spaces is conventionally obtained by providing an address space identifier field in each DLAT entry for uniquely representing the address space associated with a page identified in the page frame real address (PFRA) field in the same DLAT entry for containing the translated page address. Future accesses to data in a translated page addressed by a DLAT entry can be done quickly by using the DLAT entry to access the data in main memory, or in a cache, without having to take the time to retranslate the virtual address. U.S. Pat. No. 3,781,808 to Ahearn et al describes and claims hardware which supports these operations, as used in the IBM S/370 Model 168 CPU.

The invention provides a common storage flag indicator in each segment or page table entry, and in each DLAT entry, loaded during translation of segment table and page table entries, to indicate whether or not a page, which is addressed by the DLAT entry, is to be accessible by all address spaces in the system, or whether the page only is accessible by the address space identified in the DLAT entry.

DLAT load controls operate with the common storage indicator flag in each segment table entry, or in each page table entry, according to the application of the invention to a particular system. The common storage indicator in the preferred embodiment is a bit position in each segment table entry. In another embodiment, the common storage indicator is a bit position in each page table entry.

An address translator senses the state of the common storage bit in a translated segment table entry (or page table entry) during the translation process, and thereupon sets or resets a common storage indicator in the DLAT entry receiving the results of the translation to indicate whether the page translated in the DLAT entry is to be shared or private. If the common storage indicator is not set in the table entry, the translated page is private, and an identifier for the only address space which can use that DLAT entry is also put into the DLAT entry to prevent its shareability. If the common storage bit is set in the table entry, the DLAT receives an indicator for signalling that no examination should be made for an address space identifier which makes the DLAT entry usable by an address space.

It is essential with the invention that the hash addressing for a requesting virtual address used to select a pair of associative DLAT entries must not include hash bits from the address space identifier, as has been done in prior art DLAT hash addressing such as in U.S. Pat. No. 3,781,808 (previously referenced). Such prior hash addressing would make the invention inoperable, because it would prevent the same virtual address in different address spaces from hash addressing the same pair of DLAT entries. Therefore, the invention obtains hash bits only from the virtual address without using the address space identifier.

DLAT read controls conventionally sense the address space indicator in each DLAT entry being read. In this invention, the DLAT controls must also sense the common storage indication in any DLAT being read, which in prior processors would indicate an error condition for the DLAT being read. In the invention, when the read controls sense a common storage indication in a DLAT (in which no other conditions are violated), the DLAT read controls pass the access request with the PFRA from the DLAT to the main storage access controls which perform the access in main store or the cache.

The invention thereby obtains novel selectivity for the DLAT read controls (1) to obtain sole address space security by rejecting requests for a DLAT translation from any address space which does not have its address space indicator compare equal with the DLAT contained address space indicator, or (2) permitting all address spaces to use the DLAT translation by ignoring the address space indicator in the DLAT.

Each address space is represented in the system by a segment table, which is defined to the processor by a segment table origin (STO). Each STO is a real address for locating the beginning of a segment table. There may be a very large number of STO's useable in the system. When any STO is to be used, it is made active by being put into a control register (CR), and it is also put into a next entry in a segment table origin stack (STOK).

An address space indicator is available for each STO in the STOK as an index to the STOK, called a STO ID. The STO's each occupy 32 bits (full word) in each STOK entry, and in the CR. A STO cannot be located in more than one entry in STOK. The reason for the STOK is to minimize the number of bits needed for the address space indication in the DLATs, to reduce the DLAT size. Smaller DLATs are generally faster operating than larger DLATs. For example, a STOK containing up to 29 STO's requires only five bits for a STO ID to identify an address space, and replaces having to use all 32 bits of the STO. Whenever a new STO would cause the STOK to overflow, the oldest STO entry is reset and all DLAT entries with the associated STO ID are also reset; and the new STO is inserted at the beginning of the STOK and a corresponding DLAT entry is translated.

BRIEF DESCRIPTION OF THE DRAWINGS

FIG. 1 illustrates a block diagram of a preferred embodiment of the invention.

FIG. 2 represents a main storage map used by a second embodiment of the invention.

FIG. 3 illustrates prior art formats used by control registers, segment table entries, and page table entries.

FIG. 4A illustrates a new format for the segment table entry used by the preferred embodiment.

FIG. 4B illustrates a new format for the page table entry used by another embodiment of the invention.

FIG. 8 illustrates details of DLAT read controls used in the embodiments.

FIG. 9 shows in detail the DLAT load control used in the embodiments.

DESCRIPTION OF THE PREFERRED EMBODIMENT

Figure 5:
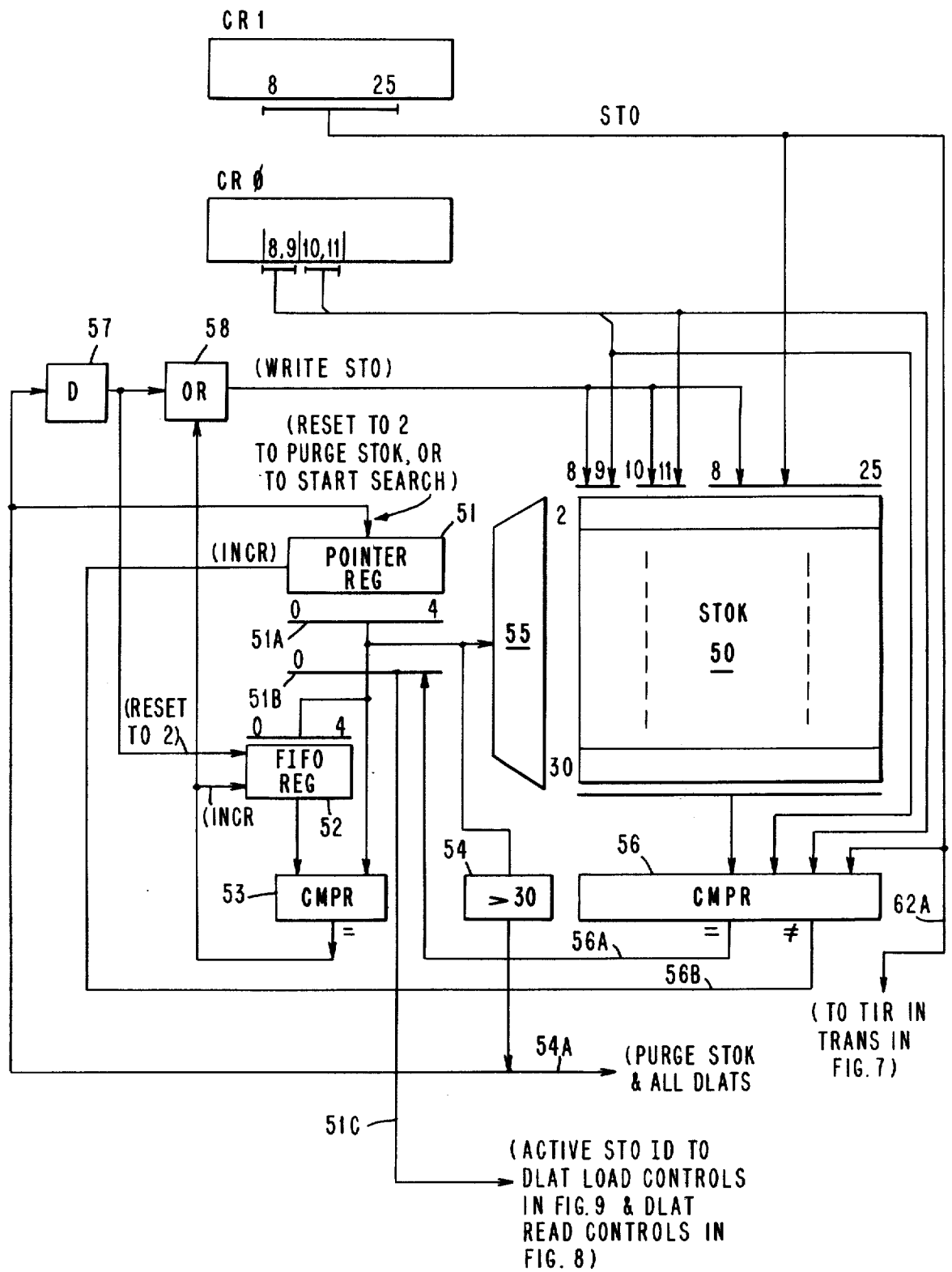
FIG. 5 illustrates in detail a STOK and its controls used in the embodiments to generate address space identifiers (STO IDs).

FIG. 1 illustrates a block diagram of the preferred embodiment. A STOK and controls 5 has a control register (CR 1) which contains the active segment table origin (STO) currently being used by the processor virtual address currently loaded into a logical address register (LAR) 61, which is currently requesting the address to be accessed. Controls 5 also contain a segment table origin stack (STOK) 50 which has entries which sequentially receive each active STO when it is loaded into CR1. The address spaces represented by the STO's in STOK are the only address spaces which are represented currently by the entries in DLAT 6. Each entry in the STOK has an index value of 2 through 30. These index values are used as a STO identifier (STO ID). The currently active STO in STOK is located by the STO ID in a pointer register (PTR REG) 51. The STO ID currently in pointer register 51 locates the STOK entry having the same STO as the STO contained currently in CR1. The reason why STO ID's 2 through 30 are only used is to accommodate an index size of five binary bits providing values 0–31, of which the values 0, 1 and 31 are used in the DLAT's to indicate the special conditions of invalid STO, no dynamic address translation (NON-DAT mode) and common storage, respectively. The later value is introduced by this invention to provide a DLAT indication that it addresses a page shareable by all address spaces. A larger STOK with more STO IDs could be provided, for example, by having a six bit STO ID support 61 STOK entries ($2^6-3$), etc.

In FIG. 1, box 54 signals an overflow condition for STOK 50 when all entries 2 through 30 are filled and another STO is to be entered into the STOK. Circuit 54 generates the overflow signal when STO ID 30 is in PTR REG 51 and a next active STO in CR1 is not found by a search of STOK entries 2 through 30. The overflow output signal from circuit 54 is transferred to DLAT load circuits 9 to reset all DLAT entries. Note that other implementations may not require this broadside invalidation technique.

DLAT 6 is structured like the DLAT found in IBM System/370 M168 CPU, except for more entries. DLAT 6 in FIG. 1 is two-way set associative, in which half of the DLAT array contains DLAT table 0 having 64 entries designated as 00 through 063, and the other half of the DLAT array is designated as DLAT table 1 containing 64 entries designated as 10 through 163. DRR register 6B contains the address of the currently selected pair of DLAT entries. The address in DRR 6B is derived by hash circuits 6A hashing bits 9 through 20 of the virtual address in LAR 61.

Figure 6:
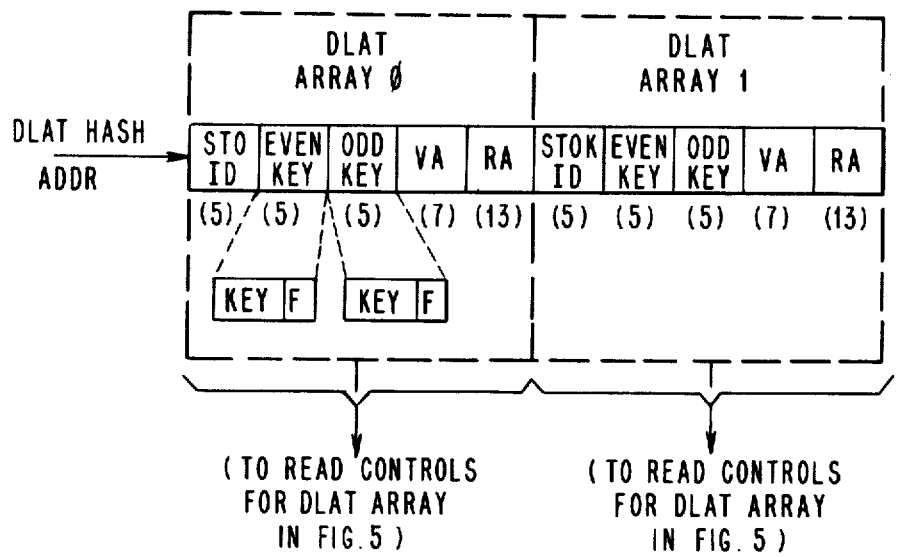
FIG. 6 illustrates the format for each pair of associated DLAT entries accessed by a single DLAT hashed address.

FIG. 6 illustrates the format for the pair of selected entries being addressed by the DRR register. It is seen therein that each entry contains a STO ID derived from either (1) pointer register 51, or (2) from a common space bit C in the segment table entry (STE) accessed for translation of the DLAT entry. Except for the addition of the common space bit C in the STE, the form of all of the entries in the segment tables, page tables, CR0 and CR1 may otherwise be identical to that used in the IBM OS/VS2 Release 3.7 system control programs known as MVS (Multiple Storage Systems) with an IBM S/370 M168 data processing system.

The translation of the virtual address is LAR 61 is conventionally done by a translator 7, in which the SX component of the address indexes the STE entries from the STO ADDRESS of the segment table in FIG. 1, which STE address is STO plus SX. The page table origin (PTO) address is in the accessed STE and is used by the translator to address the page table entry (PTE), shown as PTE-g in FIG. 1. PTE-g is addressed therein at the location PTO plus PX. The real or absolute address of the page to be accessed is contained in the PFRA component of the accessed PTE, which is then transferred by translator 7 to the load controls 9 and put into the absolute address (RA) field in the selected DLAT.

FIG. 4A illustrates the novel STE format containing the common space bit C at bit position 30, which is the STE format used in the segment table in FIG. 1. FIG. 4B shows the PTE format used in the page table in FIG. 1.

When bit C in the STE format is set to 1, the segment table entry is thereby indicated to represent a common space segment (i.e. shared segment) represented by all pages in the page table accessed by means of the PTO address within that STE. However, when bit C is off, the STE defines a private segment, i.e. not accessible by any other address space than that defined by the STO which addresses the particular segment table.

In FIG. 6, the virtual address (VA) field in the selected DLAT entry also receives bits 8-14 from the VA in LAR 61 in order to distinguish this page VA in the DLAT from all other page VA's represented in other DLAT entries, in which the hashed address always is part of the distinguishing characteristic for the virtual addresses represented in the DLAT. The even key and odd key received in the DLAT entries are respective storage protect keys for the first 2K half and last 2K half of the page, when the page is 4K in size. The means for loading the key fields in DLAT 6 is not part of this invention and is done by means in the prior art such as found in the IBM S/370 M168 CPU.

A DLAT loading operation occurs whenever the processor transfers an address into LAR 61, and the read controls find that no DLAT entry addresses the page required by the address in LAR 61. The lack of such DLAT entry is indicated by DLAT read controls 8 in FIG. 1 providing a DLAT exception signal on line 87A to translator 7. DLAT read controls 8 simultaneously compare all of the pertinent fields in each of the pair of selected DLAT entries being hash addressed by the DRR with corresponding fields comprising the VA bits 8-14 in LAR 61, the STO ID being provided from pointer register 51, and the key field provided by the program status word (PSW). If equality is found for one of the two DLAT entries 0, 1 respectively being simultaneously compared in the DLAT read controls 8, the read controls select only that DLAT having all pertinent fields equal. The selected DLAT entry then causes controls 8 to output a page frame address (RA) as a signal on line 89A to storage access controls 12 to initiate the access of one or more bytes beginning at that RA address obtained from the selected DLAT entry by concatenating it with the displacement (D) obtained from LAR 61.

However, the DLAT read controls 8 may note that a common storage indicator value of 31 exists in the STO ID field of the selected DLAT entry, in which case the DLAT read controls 8 ignore the non-equal compare due to the STO ID value 31 by forcing it to act like an equal STO ID compare for all STO ID values. Then the access of the virtual address in LAR 61 is permitted, regardless of which address space is making the request (indicated by pointer reg 51).

Accordingly, it is thereby realized that the STO ID field in the DLAT is loaded with a value that controls whether the DLAT entry is permitted to be used by only the address space which loaded it, or by all address spaces regardless of which address space loaded it. The general description of the preferred embodiment is now complete and its components shown in more detail in other figures are next described.

STOK and Controls 5

FIG. 5 illustrates the preferred circuit for the STOK and controls 5. CR0 and CR1 contain the formats illustrated in FIG. 3, in which bits 8-25 of CR1 contain the active STO address, and in CR0 bits 8 and 9 indicate the page size, i.e. a 2K or 4K byte page, and bits 10 and 11 indicate the segment size, i.e. 64K or 1,000K bytes. These CR0 bits are also entered into an entry in STOK 50 when it is loaded.

STOK 50 is permitted by these controls to contain a STO value only once. The valid STO values in STOK 50 are only those STO values contained in entry 2 up to but not included in the entry identified by the current content of a FIFO register 52. All STOK entries from the index in FIFO register 52 through index 30 are considered invalid.

Whenever a new STO value is loaded into CR1, a search is made of STOK 50 to see if that STO currently exists in STOk 50, and if it exists, the index of that entry will be provided in pointer register 51 to then represent the active STO ID on lines 51C. If the search of STOK does not find an entry containing the active STO in CR1, the STO in CR1 is loaded into the STOK entry at the index in FIFO register 52, and the FIFO register is incremented to the next sequential STOK ID value.

A STOK search is done, whenever a new STO value is entered into CR1. The search is started by setting the content of pointer register 51 to STO ID 2, which is the index of the first entry in the STOK. Then, the content of entry 2 is read out and compared with the current STO in CR1. If they compare equal, STO entry 2 represents the new STO, and it has STO ID 2. The equal condition is indicated by compare circuit 56 on line 56A to gate 51B, which thereby gates the content of pointer register 51 out as the active STO ID on lines 51C.

However, if compare circuit 56 outputs an unequal signal on line 56B, it increments the content of pointer register 51 to the next sequential STO ID value, and the comparison of that next entry in STOK 50 is then done in comparator 56 with the STO in CR1. The process then continues until an equal signal is generated, or until the STO in CR1 is loaded into the entry located by FIFO 52.

The STOK search ends whenever comparator 53 finds the pointer reg 51 content equal to the value in FIFO register 52. It is then that the active STO in CR1 is found not to be in any existing entry in STOK 50, and thereby it is then written into the STOK entry at the location currently contained in FIFO register 52, which is then equal to the entry in pointer register 51. The equal output of comparator 53 is also provided through an OR circuit 58, which then provides a write STO signal to the input gates of STOK 50, which thereby writes the active STO values provided by CR0 and 1 into that currently indexed FIFO entry.

The equal signal from comparator 53 also increments FIFO register 52 to the next sequential STO ID value.

Eventually, it is possible for the STOK 50 to have all of its entries 2 through 30 filled with STOs. Then if a new STO value is loaded into CR 1, and a search is made in the previously described manner and no equal STO value is found in STOK entries 2-30, pointer register 51 will eventually increment to the value 31 which will be sensed by circuit 54 as greater than 30 which will then output a purge DLAT signal on line 54A which will make all DLAT entries invalid. The output of circuit 54 is also fed back to the reset input of pointer register 51, which resets it to the value 2 for indexing the first entry in STOK 50. Furthermore, the output of circuit 54 is also applied through a delay circuit 57 which in effect provides a delay equal to the time needed to purge all of the DLAT entries, and upon the completion of the DLAT purge, provides an output through OR circuit 58 which writes in the new STO value into STOK entry 2.

Translator 7

Figure 7:
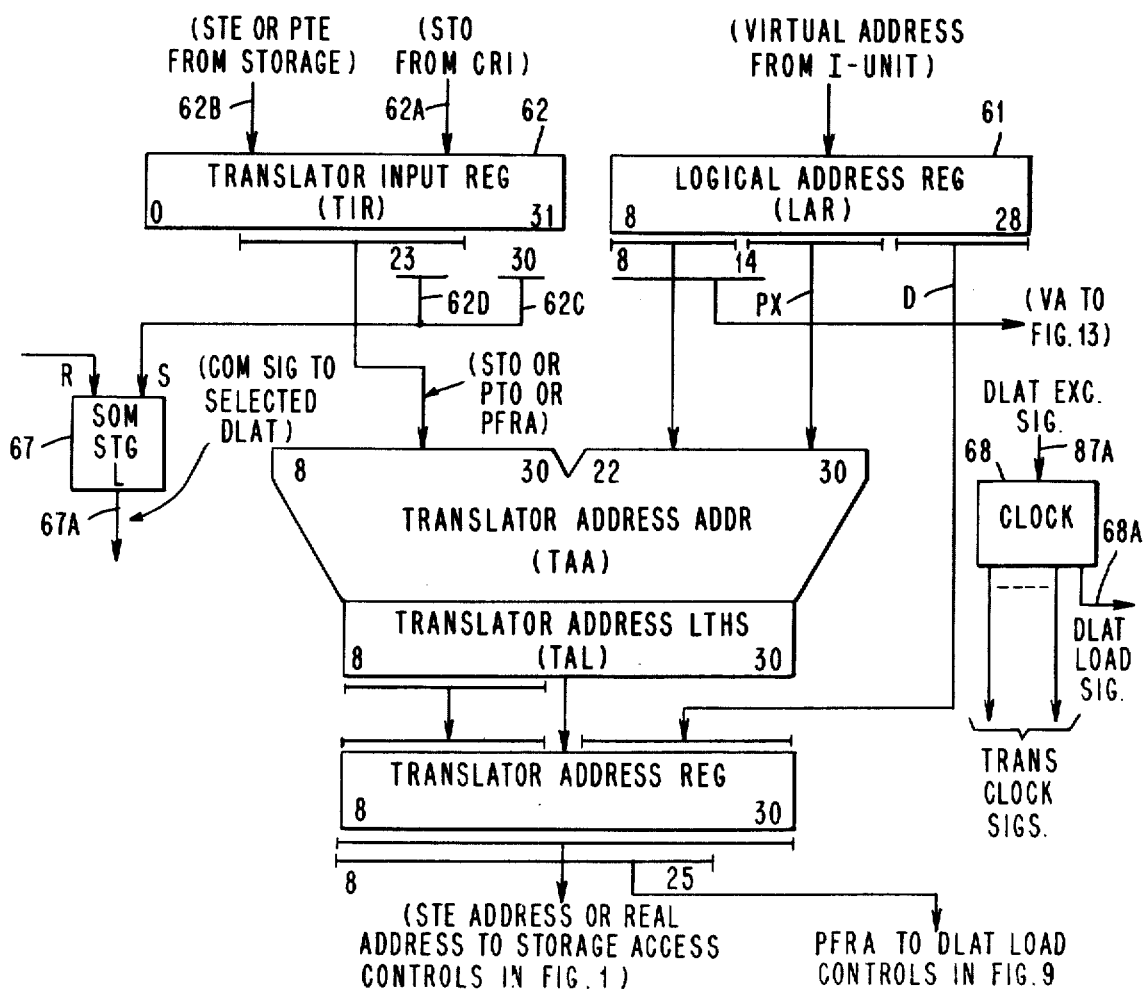
FIG. 7 illustrates details of a translator used in the embodiments.

Except for common storage latch 57 and its input gating, the translator shown in FIG. 7 is identical to the translator commercially available in the IBM S/370 Ml68 CPU. The translator inputs comprise logical address register (LAR) 61, which is also represented in FIG. 1, and a translator input register (TIR) 62. LAR 61 receives the virtual addresses from the instruction unit of the processor, and TIR 62 receives the STOs from CR 1, and the STEs and PTEs from main storage, one at a time. The state of the common space bit C in an STE is sensed by outgate 62C, which senses bit position 30 in the TIR 62. Outgate 62C is connected to the set input of common storage latch 67 and sets it on if bit C is on, and sets the latch off if bit C is off. Output lead 67A provides the latch setting to the DLAT load controls 9, which then generate and load the common storage value 31 into the STO ID of a currently selected DLAT entry, if the common space bit C is on. If the common space bit C is off, then the latch 67 is set off, and line 67A will signal controls 9 to load the STO ID being provided from pointer register 51 into the selected DLAT.

The output of translator 7 provides the addresses STO + SX, or PTO + PX, as required to access the STEs and PTEs, respectively. The PFRA + D value is not generated by the translator but is obtained by concatenation of the RA from the selected DLAT and the D value from the LAR 61 which catenation is directly done by the storage access controls 12 in order to obtain faster generation of byte addresses in a page currently available by means of a DLAT entry.

A clock 68 controls the timing involved in the translator circuitry. The clock is actuated by a DLAT exception signal on line 87A from the DLAT read controls 8. When no DLAT entry is found, the clock completes its operation by providing a DLAT load signal on line 68A which signals that the PFRA has been provided from the PTE and is now available for loading into the selected DLAT entry.

DLAT Load Controls 9

The DLAT load controls in FIG. 9 comprise a plurality of gates which load the various fields in the selected DLAT. Conventional LRU circuits (not shown) select the DLAT to be loaded. The loading circuit for the keys is not illustrated since it is similar to circuitry available in the prior IBM S/370 Ml68 CPU. In FIG. 9, the common ID generator 31 is an AND gate which receives the common space signal on line 67A and the DLAT load signals on line 68A. When activated, generator 91 provides its output as one bits on five lines to represent the binary value 31. These lines are provided through an OR circuit 96 to the STO ID field in the selected DLAT entry.

Also, line 67A connects the common space signal from latch 67 to an inverter 97 which output disables a STO ID gate 92 to inhibit the active STO ID from being passed from line 51C from the pointer register to OR circuit 96. Therefore, when common bit C is on, the only output from OR circuit 96 is the value 31 indicating the common ID for the selected DLAT.

If the common space bit is off, there will be no output from generator 91, and inverter 97 will be activating gate 92; in which case the STO ID on lines 51C will be outputted through OR circuit 96 to the five bit STO ID field in the selected DLAT entry.

VA gate 93 will be gating the LAR bits 8-14 on line 61A to the VA field in the selected DLAT to provide the VA identification. Likewise, the RA gate 94 will be passing the PFRA on line 66B of FIG. 7 to the RA field in the selected DLAT.

DLAT Read Controls 8

The DLAT Read Controls shown in FIG. 8 include two identical DLAT read control circuits 80 and 86, which respectively receive the pair of selected DLAT entries in DLAT tables 0 and 1. Each circuit 80 and 86 includes a plurality of compare circuits. In circuit 80 for example, compare circuit 81 compares the STO ID from the selected DLAT with the active STO ID received from the pointer register 51 to determine if the DLAT address is in the requesting address space. If they are equal, a signal is provided on output line 81B to an OR circuit 81A. If they are unequal, no signal is ovided on line 81B, and the DLAT's address is not in the requesting address space. However, this invention provides a common storage detector AND circuit 82 to sense if the STO ID in the selected DLAT is the common storage indicator 31. Circuit 82 is an AND gate which requires that all five STO ID inputs be ones to sense the binary 31 indication and activate the output to OR circuit 81A, which bypasses any unequal condition in circuit 81. Thus, OR circuit 81A provides an active output either if (1) the received STO ID's are equal, or if a common ID indicator is the DLAT entry.

A VA compare circuit 83 compares the VA fields in the selected DLAT with bit positions 8-14 in LAR 61. If these VA fields compare equal, the DLAT translates that VA, provided that an address space resolution signal is being provided from OR circuit 81A to condition DLAT 0 combining circuit 84, which then provide an output to a gate 85A which thereby passes the absolute address (RA) received from the selected DLAT by an RA register 85. The RA is then passed to RA select gate 89 from the RA register. The outputs of gate 85A and output 80A of circuit 84 also condition a gate 84A to select the even or odd key from the DLAT entry for being inputted to key protect circuits 88.

DLAT 1 read controls 86 contain identical circuits to the DLAT 0 read controls 80 just described.

The DLAT read controls 80 and 86 (which are simultaneously receiving the outputs of both DLAT's of the pair at a selected hash address) are making the decision of which DLAT entry of the pair, or neither, will be the DLAT selected by the current address request in LAR 61 and pointer register 51. Only one of lines 80A or 86A can be active at any one time from a pair of DLAT entries, since only one of the two circuits can have the compare equal conditions required to make active the respective line. Likewise, only one of the circuits 80 or 86 can output an RA through its gate 85A. The gated RA will be provided as in input to RA select gate 89, but it will not be permitted to exit from gate 89 unless the key in the selected DLAT entry is equal to the PSW key being received by key protect circuit 88. If the PSW key and DLAT key are equal, a signal is provided on line 88A to activate a RA select gate 89 to pass its received RA to the storage access controls, which will access the address in main storage. However, if the key compares unequal in circuits 88, a signal on line 88B indicates a key violation which will be provided to the processor interrupt circuits, and the access will be prevented by gate 89.

OR circuit 87 also has a complementary output 87B which indicates that neither input 80A or 86A is indicating a selection of either DLAT entry 0 or 1, in the pair. The signal on output line 87B generates a DLAT exception signal to indicate that the virtual address in LAR 61 is not represented by any current DLAT entry, and it is necessary for the translator to translate the virtual address into an absolute page address for a page which may be residing in main storage. If the page is not residing in main storage, then I/O activity is needed to transfer the page from an I/O device to main storage before the translator can access it and load a DLAT entry with the address translation.

Common Page Embodiment

The preferred embodiment, previously described, provides a common segment indicator in the STE's which are common to all address spaces, i.e. all segment tables; and all pages in a common segment (i.e. page table) are implicitly included in the common segment without requiring any indicator in the page tables. That is, a single common segment bit C made the plurality of pages in that segment common to all address spaces.

The common page embodiment resolves the common space to the page level, rather than to the segment level found in the first embodiment. But, in either embodiment, the common storage ID entry in the DLAT applies only to the page represented by the DLAT entry.

The second embodiment therefore permits some pages in a segment to be shared pages common to all address spaces, while other pages in the same segment can be restricted only to a single address space. The determining factor for which pages will be shareable in common is controlled by placing the common space bit C in the page table entries (PTE) rather than in the segment table entries (STE). This is shown in FIG. 2, in which the common space bit C is shown in PTE-g to represent one entry in page table i. Accordingly, pages represented in the page table g can be selectively made shareable or not shareable among the address spaces by merely setting or not setting indicator bit C on or off in any common space indicator in the STEs, which may then have the conventional format shown in FIG. 3. The new PTE entry in FIG. 2 is illustrated in FIG. 4B.

The only difference in the detailed hardware shown to support the PTE common bit C in FIG. 2 (rather than the STE common bit in FIG. 1) is in FIG. 7 in which TIR outgate 62D is used for sensing the state of PTE bit 23; and outgate 62C need not be provided.

All other circuits in FIGS. 5, 6, 7, 8 and 9 need not to be changed. Value 31 is still used as the common storage indicator in the DLAT but it now automatically will be used to control shareability on a page basis rather than on a segment basis.

It will be understood that the common storage indicator used in the DLATs need not be the value 31 but may be any unique indication useable in all DLATs. For example, it may be an extra flag bit in each DLAT set to the state of the C bit found in the translated STE or PTE.

Although the invention has been shown and described with respect to plural embodiments thereof, it should be understood by those skilled in the art that various changes and omissions in the form and details of the invention may be made therein without departing from the spirit and the scope of the invention, which is to be limited only as set forth in the following claims.

What is claimed is:

1. Shareable page control means for a data processing system, which can have pages in different address spaces which can have the same virtual addresses, the address spaces being identified by respective segment tables, control register means identifying an active segment table, and a virtual address register for containing a virtual address to be accessed in the address space of the active segment table, comprising a dynamic look-aside array having a plurality of buffer entry units called DLATs, each DLAT having fields for containing a virtual and a real address for a page, and also having a field for identifying a segment table associated with any page address in the DLAT, DLAT addressing means for receiving selected bit positions of the virtual address register to generate a DLAT address for selecting a subset of the DLATs in the array, each subset having at least one DLAT, address translation means for translating a virtual address in the virtual address register into a real address by accessing a segment table entry (STE) in the active segment table and accessing therefrom a page table entry (PTE) to obtain a page frame address, a share control field being provided in each STE for indicating the shareablility of all pages referenced by the STE, DLAT loading means for loading into a selected DLAT a direct or indirect address of the active segment table, a virtual address of a page from the virtual address register, and a page frame address from the address translation means, share control means with the address translation means for sensing the state of the share control field in the STE and being connected to the DLAT loading means for loading the selected DLAT with a signal indicating the state of a sensed share control field, whereby a share control signal in any DLAT can signal if a page addressed by the DLAT is to be shared by plural address spaces or if the page is to be restricted to the address space of the segment identified in the DLAT.

2. Shareable page control means for a data processing system having pages in different address spaces which can have the same virtual addresses, a virtual address register for containing a virtual address to be accessed, and a control register for containing a segment table address for identifying the address space having an address in the virtual address register, comprising a dynamic look-aside array having a plurality of buffer entry units called DLATs, each DLAT having a field for containing a virtual and a real address for a page and also having a field for identifying a segment table, which defines one of a plurality of address spaces, DLAT addressing means for receiving selected bit positions of the virtual address register to generate a DLAT address for selecting a subset of the DLATs in the array, each subset having at least one DLAT, address translation means for translating a virtual address in the virtual address register into a real address by accessing a segment table entry (STE) in the active segment table and therefrom a page table entry (PTE) to obtain a page frame address, a share control field being provided in each STE for indicating the shareability of all pages referenced by the STE, DLAT reading means for outputting the contents of an addressed DLAT, including a direct or indirect address of a segment table, a virtual address of a page, a page frame address, and a share control signal for indicating the shareable state of the page referenced by the addressed DLAT, virtual address comparing means for comparing the virtual addresses for a page from the DLAT reading means and from the virtual address register to generate a VA compare signal, segment comparing means for comparing the segment table addresses from the DLAT reading means and from the control register to provide an address control signal, share signal means for sensing and outputting the state of a share-control signal from the DLAT reading means, real address transfer means connected to an output of the share signal means and to the address control signal from the segment comparing means for controlling the transfer of the page frame address from the DLAT reading means, whereby the share signal means can enable the real address transfer means to control whether the page frame address in the addressed DLAT can be used only by the segment table identified in the addressed DLAT, or by any segment table, by disregarding the compare output of the segment comparing means.

3. Shareable page control means for a data processing system, which can have pages in different address spaces which can use the same virtual addresses, the address spaces being identified by respective segment tables, control register means identifying an active segment table, and a virtual address register for containing a virtual address to be accessed in the address space of the active segment table, comprising a dynamic look-aside array having a plurality of buffer entry units called DLATs, each DLAT having fields for containing a virtual and a real address for a page, and also having a field for identifying a segment table associated with any page address in the DLAT, DLAT addressing means for receiving selected bit positions of the virtual address register to generate a DLAT address for selecting a subset of the DLATs in the array, each subset having at least one DLAT, address translation means for translating a virtual address in the virtual address register into a real address by accessing a segment table entry (STE) in the active segment table and accessing therefrom a page table entry (PTE) to obtain a page frame address, a share control field being provided in each PTE for indicating the shareability of a single page referenced by the PTE, DLAT loading means for loading into a selected DLAT a direct or indirect address of the active segment table, a virtual address of a page from the virtual address register, and a page frame address from the address translation means, share control means with the address translation means for sensing the state of a share control field in the PTE and being connected to the DLAT loading means for loading the selected DLAT with a signal indicating the state of a sensed share control field, whereby a share control signal in any DLAT can signal if a page addressed by the DLAT is to be shared by plural address spaces or if the page is to be restricted to the address space of the segment identified in the DLAT.

4. Shareable page control means for a data processing system, which can have pages in different address spaces which can have the same virtual addresses, the address spaces being identified by respective segment tables, a control register identifying an active segment table, and a virtual address register for containing a virtual address to be accessed in the address space of the active segment table, comprising a dynamic look-aside array having a plurality of buffer entry units called DLAT's, each DLAT having fields for containing a virtual and a real address for a page, and also having a field for iden tifying a segment table associated with any page address in the DLAT, DLAT addressing means for receiving selected bit positions of the virtual address register to generate a DLAT address for selecting a subset of the DLAT's in the array, each subset having at least one DLAT, address translation means for translating a virtual address in the virtual address register into a real address by accessing a segment table entry (STE) in the active segment table and accessing therefrom a page table entry (PTE) to obtain a page frame address, a share control field being provided in each PTE for indicating the shareability of the single page referenced by the PTE, DLAT reading means for outputting the content of a selected DLAT, including a direct or indirect address of a segment table, a virtual address of a page, a page frame address, and a share control signal for indicating the shareable state of the page referenced by the addressed DLAT, virtual address comparing means for comparing virtual addresses for a page from the DLAT reading means and from the virtual address register to provide a VA compare signal, segment comparing means for comparing the segment table addresses from the DLAT reading means and from the control register to provide an address control signal, share signal control means for combining the share-control signal of the DLAT and the output of the segment comparing means, the real address transfer means being connected to outputs of the share signal means and the page frame address of the DLAT reading means for controlling the outputting of the page frame address of the selected DLAT, whereby the share-signal control means can enable the real address transfer means to output the page frame address when the share signal control means senses a shared state indicated for the selected DLAT, regardless of the compare output of the segment comparing means, but enabling normal non-shared page control when a non-shared state is indicated for the selected DLAT.

5. A shareable page control means as defined in claim 1 further comprising
said shared control field being a single bit in each STE, the bit being set on to indicate shareability for all pages in the segment defined by the STE, and the share control field being set off to indicate non-shareability for all of the pages in the defined segment.

6. A shareable page control means for a multiple address space virtual addressing system, comprising
a dynamic look-aside array having a plurality of buffer entry units called DLAT's, each DLAT having fields for containing a virtual and a real address for a page, and also having a field for identifying a segment table associated with any page address in the DLAT, DLAT addressing means for receiving selected bit positions of the virtual address register to generate a DLAT address for selecting a subset of the DLAT's in the array, each subset having at least one DLAT, control register means for addressing an active segment table, address translation means for translating a virtual address in the virtual address register into a real address by accessing a segment table entry (STE) in the active segment table and accessing therefrom a page table entry (PTE) to obtain a page frame address, a share control field being provided in each STE for indicating the shareability of all pages referenced by the STE, DLAT loading means for loading into a selected DLAT a direct or indirect address of the active segment table, a virtual address of a page from the virtual address register, and a page frame address from the address translation means, share control means with the address translation means for sensing the state of the share control field in the STE and being connected to the DLAT loading means for loading the selected DLAT with a signal indicating the state of a sensed share control field, whereby a share control signal in any DLAT can signal if a page addressed by the DLAT is to be shared by plural address spaces or if the page is to be restricted to the address space of the segment identified in the DLAT.

7. A shareable page control means as defined in claim 3, further comprising
the share control field in each PTE being a single bit, the share control field being set on to indicate that the page referenced by the respective PTE is shareable by other segments, and the share control field being set off to indicate that the respective page is accessible only by the segment indicated in the respective DLAT.

8. A shareable page control means as defined in claim 4, comprising
the share control field in each PTE being a single bit, the share control field being set on to indicate that the page referenced by the respective PTE is shareable by other segments, and the share control field being set off to indicate that the respective page is accessible only by the segment indicated in the respective DLAT.

9. A shareable page control means as defined in claim 1, in which the share control means further comprises,
segment identifier gate means having a plurality of inputs and having an output for connecting a segment identification to the DLAT loading means,
a segment table origin stack (STOK) having a plurality of STOK entries for storing the addresses of segment table origins (STOs), a pointer register for containing an address of an active STO in the STOK,
means for connecting an output of the pointer register to an input of the segment identifier gate means,
a page fault signal input connected to an input of the segment identifier gate means, and
means for connecting the share control field in a current STE to an input of the segment identifier gate means.

* * * * *